United States Patent [19]

Kuznicki et al.

[11] Patent Number: 5,071,804

[45] Date of Patent: Dec. 10, 1991

[54] ION-EXCHANGE AGENT AND USE THEREOF IN EXTRACTING HEAVY METALS FROM AQUEOUS SOLUTIONS

[75] Inventors: Steven M. Kuznicki, Easton, Pa.; John R. Whyte, Jr., New York, N.Y.

[73] Assignee: Engelhard Corporation, Iselin, N.J.

[21] Appl. No.: 242,008

[22] Filed: Sep. 8, 1988

[51] Int. Cl.$^5$ ............................................. B01J 20/18
[52] U.S. Cl. ...................................... 502/64; 423/328
[58] Field of Search .................... 502/64, 85; 423/118, 423/328

[56] References Cited

U.S. PATENT DOCUMENTS 2,865,867 12/1958 Van Dyke et al. .................. 502/64
4,345,946 8/1982 Tu et al. ................................ 502/64
4,513,091 4/1985 Chang et al. .......................... 502/85

OTHER PUBLICATIONS

Zeolite Chemistry and Catalysis, Jule A. Rabo, ACS Monograph 171, Wash., D.C., 1976, pp. 33-35.
Zeolite Molecular Sieves, Breck, John Wiley & Sons, N.Y., 1974, pp. 554-558.

*Primary Examiner*—Carl F. Dees

[57] ABSTRACT

A novel ion-exchange agent, an aluminum-enriched analogue to the zeolite chabazite, hereinafter "Al-Chab" is disclosed. The Al-Chab is used in processes for recovering precious metals from aqueous solutions or for removing toxic heavy metals from contaminated aqueous streams.

5 Claims, 6 Drawing Sheets

MINERAL CHABAZITE

AL-CHAB

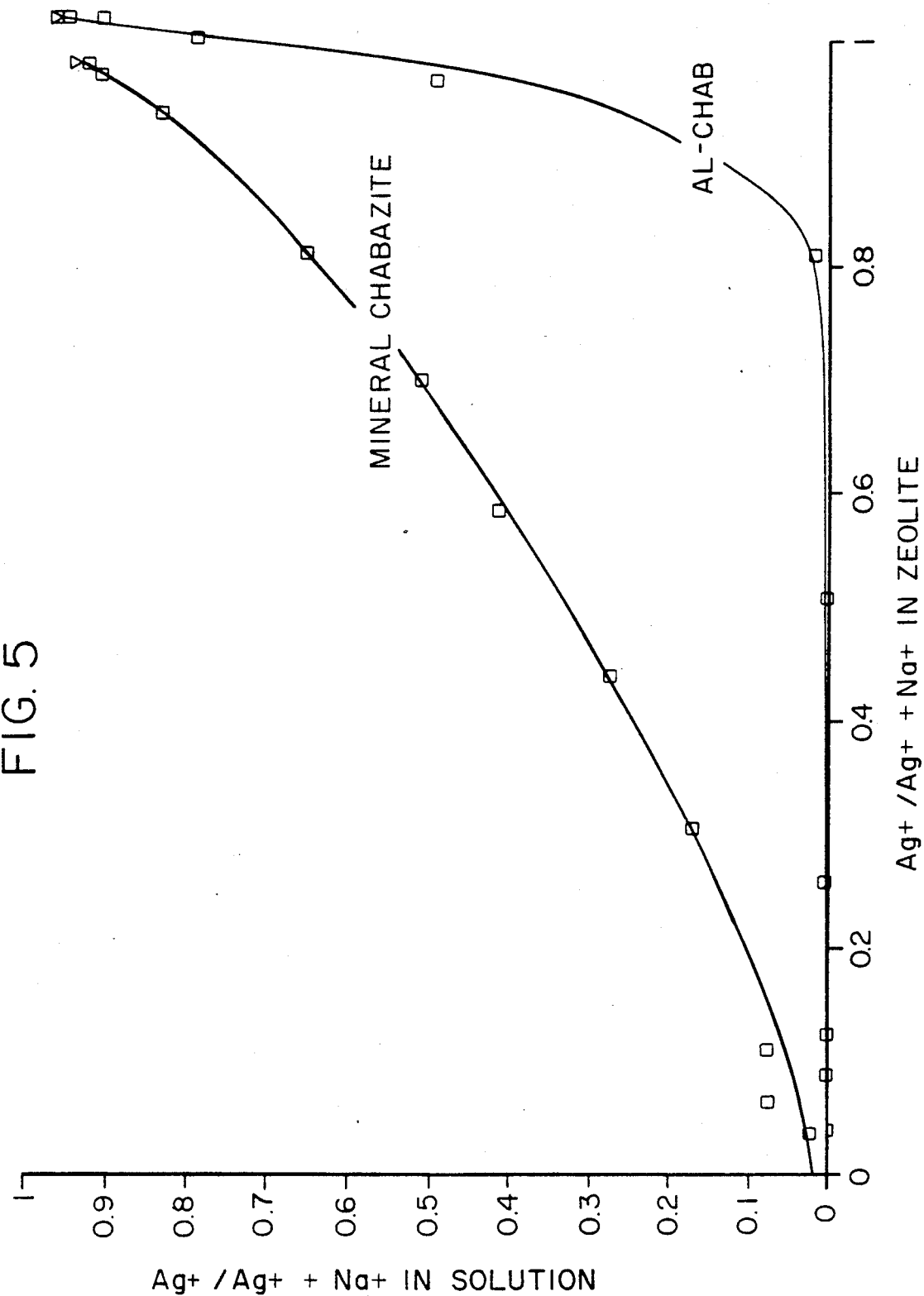

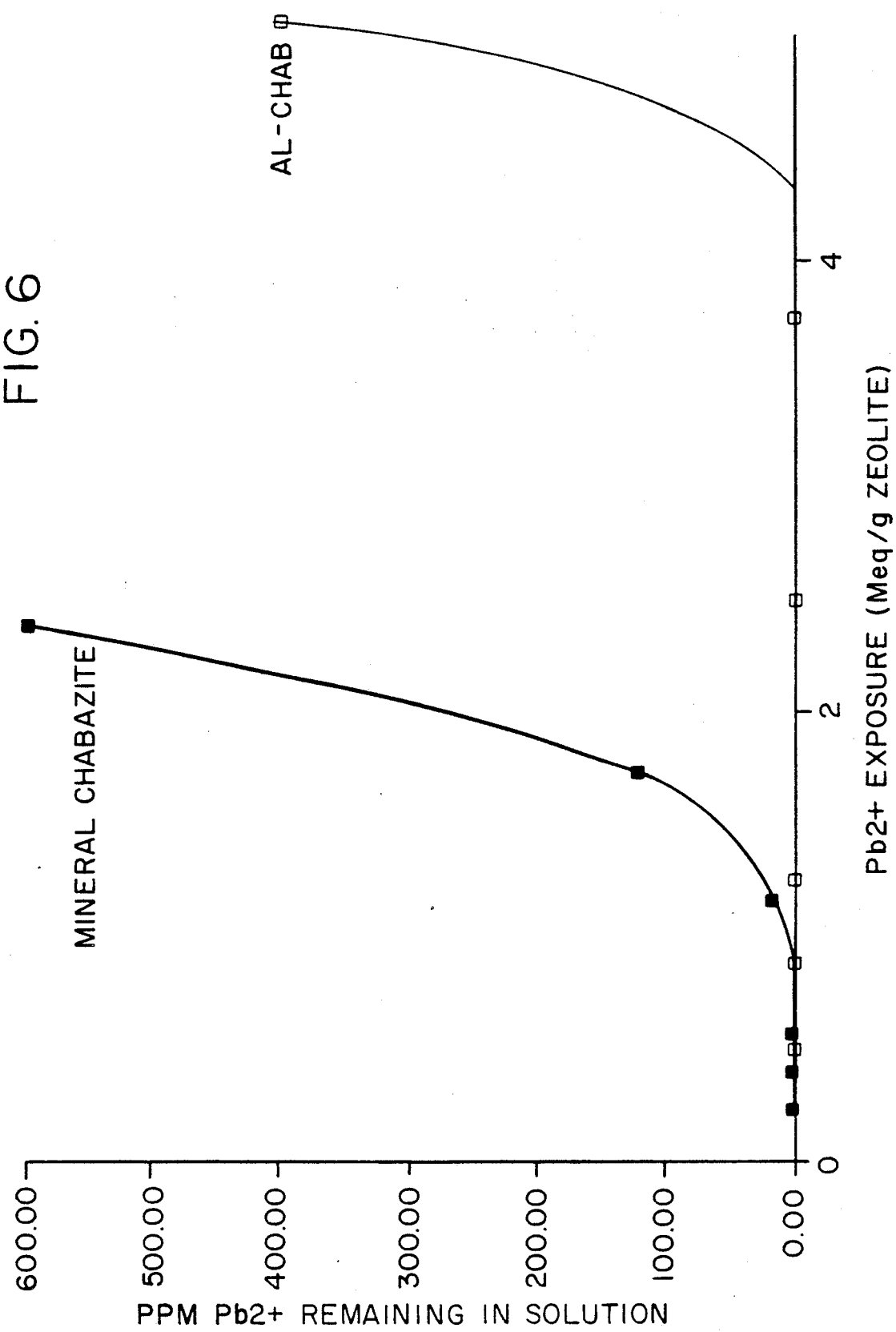

ION-EXCHANGE AGENT AND USE THEREOF IN EXTRACTING HEAVY METALS FROM AQUEOUS SOLUTIONS

FIELD OF THE INVENTION

This invention relates to processes for recovering precious metals from aqueous solutions or for removing toxic heavy metals from contaminated aqueous streams by the use of a novel ionexchange agent, an aluminum-enriched analogue to the zeolite chabazite, hereinafter "Al-Chab." This invention also relates to the novel ion-exchange agent, Al-Chab, and the preparation thereof.

BACKGROUND OF THE INVENTION

Each year in the United States, 40 million tons of precious metal-bearing waste is generated. Of this, only about 5% is currently processed for recovery of the valuable constituents (Reddy, R. G., 'Metal, Mineral Waste Processing and Secondary Recovery,, J. Metals, Apr. 1987, 34–38). Three main secondary sources of precious metals are aqueous solutions such as electroplating waste, solids and sludges such as salts and copper refinery anode slimes and metal scrap such as wire and printed circuit boards (Moore, J. J., *Chemical Metallurgy*, Butterworths, London, U. K., 1981, p. 267).

A method for silver recovery from secondary solid sources using a sulfuric acid leach was developed by Kunda ('Hydrometallurgical Process for Recovery of Silver from Silver Bearing Materials,' Hydrometallurgy, 1981, 77–97). His method for recovery of metallic silver from the sulfate solution involved precipitation of silver sulfate, dissolution of this silver sulfate and, finally, hydrogen precipitation of metallic silver.

Of the many electrolytic processes that have been commercialized for metal recovery from plating waste solutions, some are claimed to have applicability to precious metals. Examples include the Retec heavy metal recovery system which is based on electrolysis onto a porous metal electrode (Duffey, J. G., 'Electrochemical Removal of Heavy Metals from Wastewater,' Products Finishing, Aug. 1983, 72–75) and the Andco heavy metal removal system, which is based on electrochemical precipitation ('Andco Heavy Metal Removal Systems, Actual Performance Results,' Andco Environmental Processes, Inc., not dated). Solvent extraction has also been investigated for recovery of silver from aqueous solutions (Rickelton, W. A. and A. J. Robertson, 'The Selective Recovery of Silver by Solvent Extraction with Triisobutylphosphine Sulfide,' Society of Mining Engineers of AIME, Preprint No. 84-357, 1984).

Much of the technology for the recovery of precious metals from solids by smelting is derived from fire assaying techniques (Gold Institute, 'The Fire Assay of Gold,' published by the Institute, Jan. 1985). Smelting for metal recovery is limited to materials of high precious metals content (generally greater then 10%) since the matrix containing the metals is destroyed by the process. Smelting would thus be limited to materials such as copper anode slimes and metal alloy scrap. Loaded sorbents or ion-exchange agents could be processed economically by smelting if they were very highly loaded, beyond the range of what is typical for carbonaceous or organic sorbents.

In general, smelting requires fluxes and other slag-forming agents. A reducing agent such as zinc or starch may also be required. The composition of the smelting charge must be determined on a case-by-case basis.

U.S. Pat. No. 4,456,391 (Reimann, 'Recovery of Silver from Silver Zeolite') discloses a process for recovering high purity silver from a silver exchanged zeolite (of unspecified composition) used to recover iodine from radioactive waste streams. The process involves heating the silver exchanged zeolite with slag forming agents to melt and fluidize the zeolite, releasing the silver. The silver concentrate is re-melted and treated with oxygen and a flux to remove impurities.

The toxicity of certain heavy metals such as lead has been known to man for centuries. In the United States, the Environmental Protection Agency has declared lead and its compounds to be priority environmental pollutants and has begun establishing concentration limits for drinking water(Tackett, S. L., 'Lead in the environment: Effects of human exposure,' American Laboratory, Jul. 1987, 32–41).

Lead removal from aqueous streams has largely been based on precipitation by pH adjustment with agents such as CaO. Unfortunately, such methods often result in gelatinous precipitates which are hard to handle, and these methods are usually not effective in solutions containing complex ions. Alternative methods have been proposed including electrodialysis, liquid membrane separation and ion-exchange (Liozidou, M. and R. P. Townsend, 'Ion-exchange properties of natural clinoptilolite, ferrierite and mordenite: Part 2. Lead-sodium and lead-ammonium equilibria,' Zeolites, Mar. 1987, 153–159). Application of the natural zeolites mordenite and clinoptilolite to the control of lead pollution has been proposed (Liozidou, M., 'Heavy metal removal using natural zeolites,' Proc. 5th Int. Conf. on Heavy Metals in the Environment, Vol. I, 1985, pp 649–651). However, these materials are of relatively low exchange capacity ($<2$ meq/g) and of unimpressive selectivity, a vital concern in dealing with streams where competing ions predominate.

The aluminum framework enrichment technique employed in the practice of this invention using chabazite may be utilized with other zeolites. Tu, U.S. Pat. No. 4,250,059, describes a technique for preparing a catalytic composite by calcining a zeolite in a mixture with alumina, but does not comment on whether or not the alumina enters the zeolite framework. U.S. Pat. No. 4,683,334 (Bergna, et. al.), relates to modifications of a zeolite which may be chabazite by elements which may be aluminum.

Examples of the use of chabazite in adsorptive or catalytic applications are given by Sherman, et. al. (U.S. Pat. No. 4,663,052), Bergna, et. al. (see above), Coe, et. al. (U.S. Pat. No. 4,732,584) and Abrams, et. al. (U.S. Pat. No. 4,737,592).

THE INVENTION

It would be desirable to identify an adsorbent with a high capacity and extreme selectivity for toxic heavy metals such as lead in its common form ($Pb^{2+}$). This is accomplished by the present invention.

It would also be desirable to identify a high selectivity, high capacity adsorbent for precious metals from which the metals can be extracted simply and economically in a relatively pure state. This is also accomplished by the present invention.

In accordance with this invention, a novel high capacity, highly selective adsorbent is provided by treating a source of the mineral chabazite with an alkaline solution containing a source of aluminum to introduce additional aluminum into the framework of the chabazite, preferably introducing sufficient aluminum to result in a framework Si:Al molar ratio of about 1:1, thereby maximizing the number of potentially active sites for ion-exchange.

FIG. 1 is a plot of the calcium exchange capacity of the Al-Chab product as a function of the amount of hydrous alumina incorporated into the reaction mixture. FIG. 2 is a graphical comparison of the X-ray diffraction (XRD) powder patterns of the starting sodium chabazite and the Al-Chab product. FIG. 3 is a graphical comparison of the XRD powder patterns of the novel Al-Chab product and zeolite K-GI prepared in-house. FIG. 4 is a comparative plot of ammonium ion-exchange isotherms for mineral chabazite and the novel product, Al-Chab.

FIG. 5 is a comparative plot of silver ion-exchange isotherms for mineral chabazite and Al-Chab.

FIG. 6 is a comparative plot of equilibrium lead removal from solution by mineral chabazite and Al-Chab.

DESCRIPTION OF PREFERRED EMBODIMENTS

Figure 1:
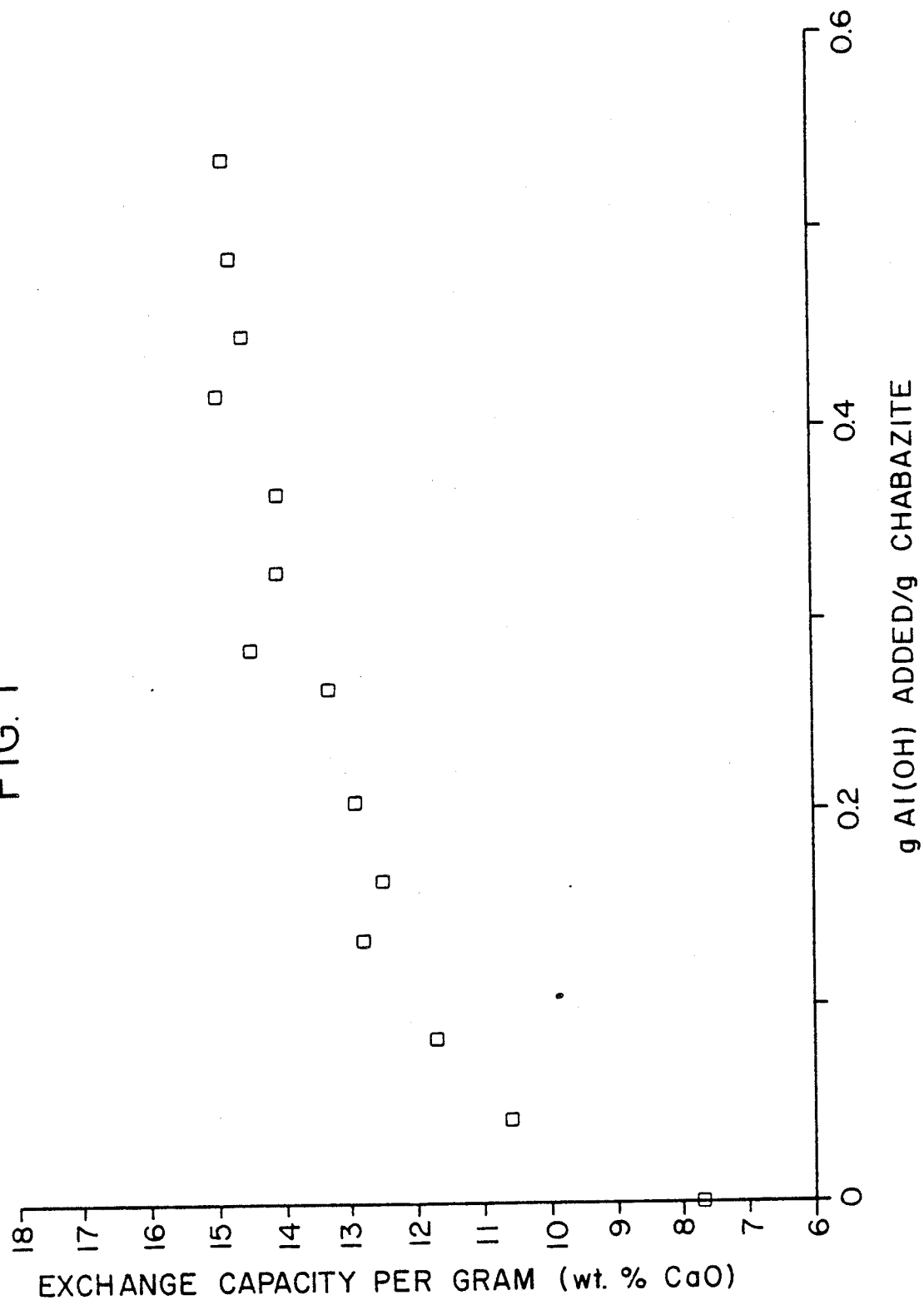

In order to maximize the number of potentially active sites for ion-exchange reactions, the framework aluminum content of a zeolite must be brought to a maximum. This maximum is obtained in an aluminosilicate zeolite when the framework Si:Al ratio approaches I, as it does in the Al-Chab product. (Normally the Si:Al molar ratio of pure mineral chabazite is about 3.0). A lesser degree of aluminum incorporation may be accomplished by reducing the available aluminum below the amount necessary to equal the molar amount of available silicon during the conversion (see FIG. 1). However, exchangeable framework aluminum sites, as measured by absolute calcium exchange capacity at reflux temperatures, will not increase above their maximum at a 1:1 Si:Al ratio with further addition of soluble aluminum.

Figure 2:
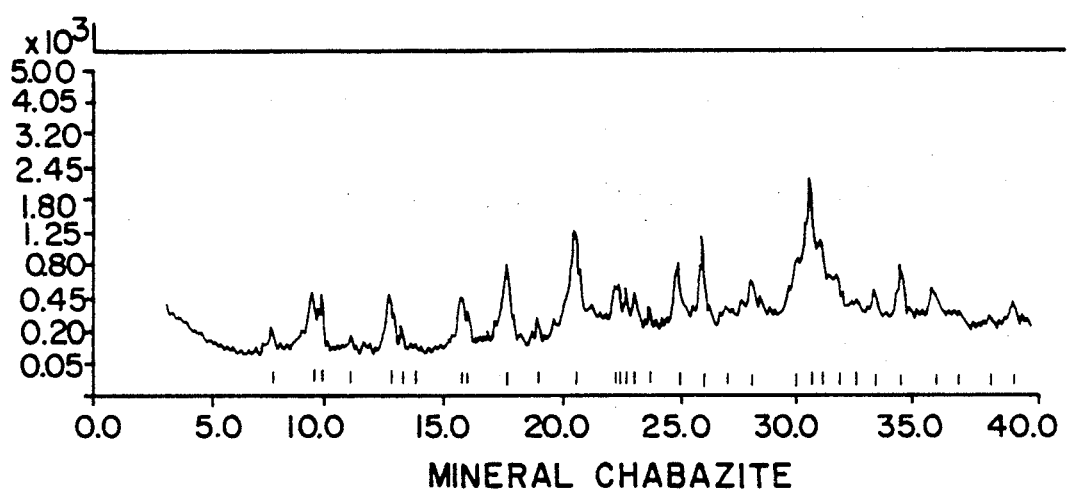
Figure 2:
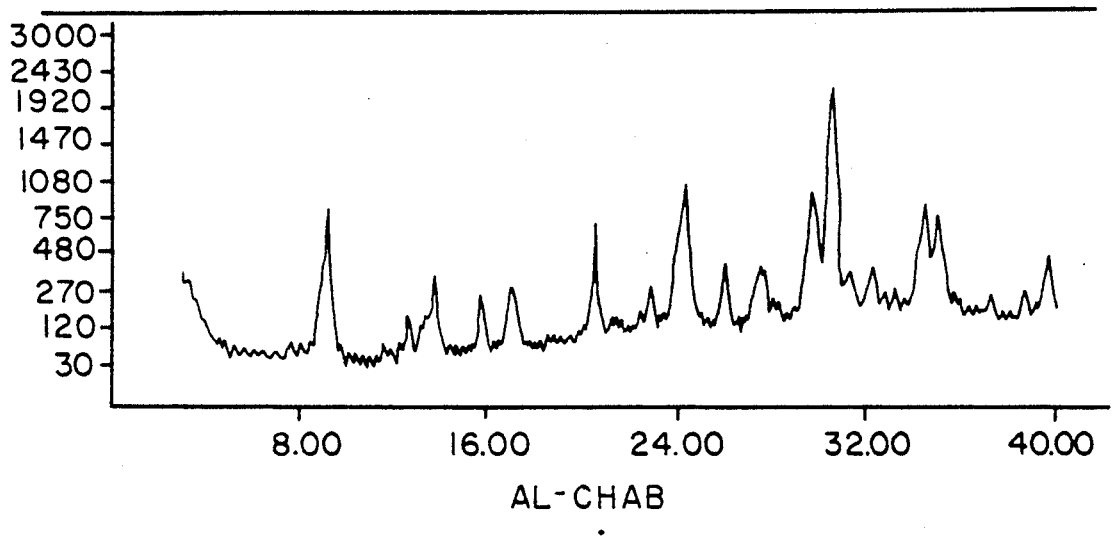
Figure 3:
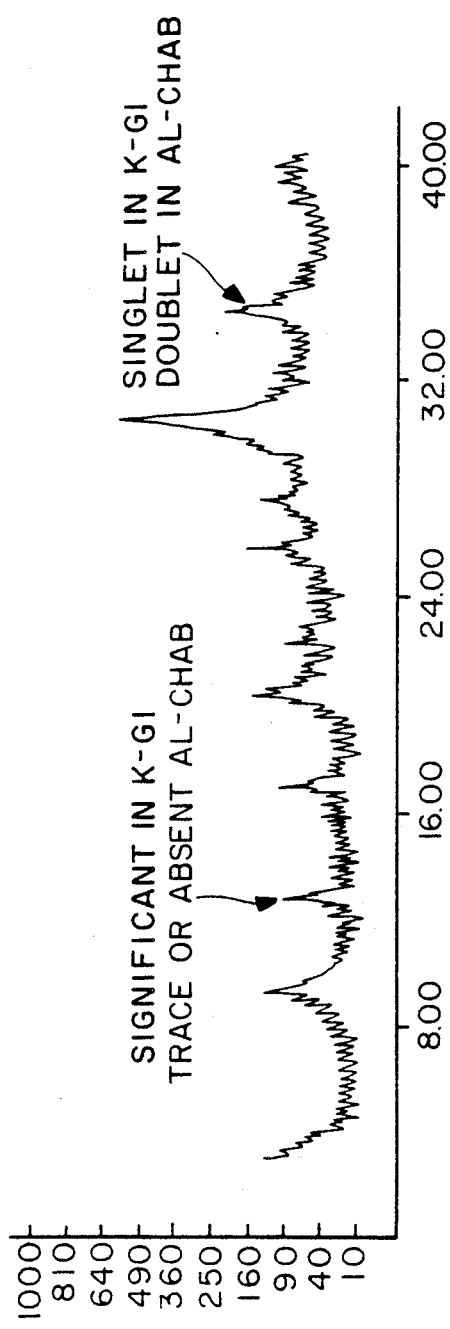
Figure 3:
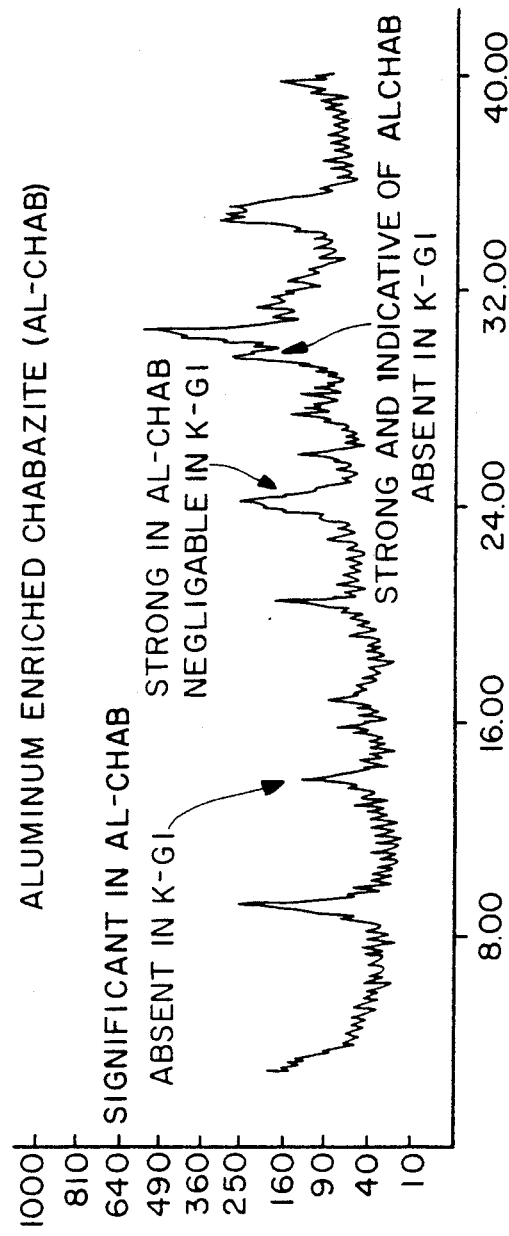

In a typical preparation of the ion-exchange agent of the present invention, Al-Chab, 250g (air-equilibrated) of Bowie, Arizona raw mineral chabazite was ground to a nominal particle size of −200 mesh and combined with 1.0 kg D. I. $H_2O$, 110g NaOH and 120 g Hydral$^R$ alumina (64.1 wt. % $Al_2O_3$) in a ½ gallon plastic jug. The jug was placed open in a constant temperature bath at 72.5±2° C. and the contents were agitated gently by an overhead stirrer for 72 hours. The contents were rinsed with 3 liters of D. I. water and following drying for 2 hours at approximately 125° C. were characterized by XRD, wet chemical analysis and ion-exchange. Chemical analysis of the recovered (approximately 350 g) material and the starting Bowie, Arizona mineral chabazite are presented as Table 1. A comparison of the XRD patterns of the starting Bowie mineral chabazite and the Al-Chab product is shown in FIG. 2.

Synthetic zeolite K-GI (Barrer, R. M., J. Chem. Soc. Faraday Trans. 1, 1956, 68), and the newly discovered mineral willhendersonite are claimed to be "high aluminum" types of chabazite and therefore serve as the closest comparative members of the known chabazite-type zeolites to any potentially new aluminum-enriched member. Samples of K-GI were prepared in-house using the method of Barrer. Samples of willheneersonite were unavailable.

TABLE 1

Chemical Compositions and Ion-Exchange Capacities of Chabazite and Al-Chab

| (V.F. Basis) | Mineral Chabazite | Al-Chab Product |
|---|---|---|
| $Al_2O_3$ | 17.1 | 35.2 |
| $SiO_2$ | 65.7 | 41.2 |
| $Na_2O$ | 9.0 | 19.9 |
| CaO | 1.47 | 0.2 |
| $K_2O$ | 0.45 | 0.45 |
| MgO | 3.32 | 0.5 |
| $Fe_2O_3$ | 3.70 | 1.94 |
| LOI(1,000° C.) | 20.5 | 18.3 |
| Si:Al | 3.26 | 0.99 |
| $Na^+$ available for ion-exchange* | 2.90 meq/g | 6.42 meq/g |

*calculated from sodium analyses

X-ray powder diffraction patterns serve as a prime tool in differentiating between molecular sieve zeolites. A comparison of the XRD patterns of zeolite K-G1 (Breck, D. W., Zeolite Molecular Sieves, R. E. Krieger Publishing Co., Malabar, FL, 1984, p. 358), willhendersonite (peacor, D. R.: P. J. Dunn, W. B. Simmons, E. Tillmanns and R. X Fischer, "Willhendersonite, a new zeolite isostructural with chabazite," American Mineralogist, 1984, 186–189) and the new species Al-Chab is presented in Table 2. The pattern of the Al-Chab was obtained with a Phillips Model 3720 Automated X-ray Diffractometer using Cu-Ka radiation. The willhendersonite and K-G1 patterns were taken from the references. It is evident from the comparison of the patterns that, while willhendersonite resembles mineral chabazite, its powder pattern is much different from that of Al-Chab. Willhendersonite, for example, does notshow the strong Al-Chab peaks at 3.02 and 2.60A°. Significant differences are also noted between the patterns for Al-Chab and K-Ga. In general, there are large differences in position for all peaks between the lead peaks at about 9.5A° and the major peaks at about 2.92A°.

TABLE 2

| X-Ray Diffraction Patterns [d-A°, $(I/I_o)$]* | | |
|---|---|---|
| K-G1 | Willhendersonite | Al-Chab |
| 9.47 (ms) | — | 9.48 ± .05 (40 ± 10) |
| — | 9.16 (100) | — |
| 6.90 (m) | — | — |
| — | — | 6.36 ± .04 (15 ± 5) |
| 5.22 (m) | 5.18 (30) | — |
| 4.32 (s) | — | 4.33 ± .03 (30 ± 10) |
| — | 4.09 (40) | — |
| 3.97 (ms) | 3.93 (20) | — |
| — | 3.82 (20) | — |
| 3.70 (w) | 3.71 (30) | 3.68 ± .02 (45 ± 10) |
| 3.46 (w) | — | 3.44 ± .02 (10 ± 5) |
| — | — | 3.24 ± .02 (15 ± 5) |
| 3.11 (mw) | — | — |
| — | — | 3.02 ± .01 (35 ± 10) |
| 2.93 (vvs) | 2.907 (60) | 2.92 ± .01 (100) |
| 2.80 (w) | 2.804 (50) | — |
| 2.59 (s) | — | 2.60 ± .01 (35 ± 10) |
| — | — | 2.56 ± .01 (25 ± 10) |
| — | 2.538 (20) | — |
| — | 2.508 (20) | — |

*0–40° 2-theta, $I/I_o > 10\%$ only

Some of this difference in XRD patterns could possibly have been due to differences in the counter-ions (cations) present in the various species. XRD patterns of various cation-exchanged from of Al-Chab, however, show minor changes in interplanar spacing and peak relative intensity, much smaller than the differences between the three minerals.

To further establish the uniqueness of the invention material, a sodium form of K-G1 was prepared in-house using the method of Barrer. The XRD patterns of the in-house prepared K-G1 and Al-Chab are compared to the pattern given for K-G1 by Barrer in Table 3. It is seen there that the pattern for the K-G1 prepared in-house very closely matches that given by Barrer, and that either K-G1 pattern shows large differences from the Al-Chab pattern as described above.

TABLE 3

X-Ray Diffraction Patterns [d-A°, (I/I$_0$)]*

| K-G1 (Barrer) | Na- K-G1 (in-house) | Al-Chab |
|---|---|---|
| 9.47 (ms) | 9.44 (ms) | 9.48 (40) |
| 6.90 (m) | 6.87 (mw) | — |
| — | — | 6.36 (15) |
| 5.22 (m) | 5.18 (mw) | — |
| 4.32 (s) | 4.33 (mw) | 4.33 (30) |
| 3.97 (ms) | 3.96 (mw) | — |
| 3.70 (w) | 3.68 (vvw) | 3.68 (45) |
| 3.46 (w) | 3.44 (ms) | 3.44 (10) |
| — | 3.22 (w) | 3.24 (15) |
| 3.11 (mw) | — | — |
| — | — | 3.02 (35) |
| 2.93 (vvs) | 2.93 (vvs) | 2.92 (100) |
| 2.80 (w) | 2.79 (w) | — |
| 2.59 (s) | 2.60 (ms) | 2.60 (35) |
| — | — | 2.56 (25) |

*0–40° 2-theta, I/I$_0$ > 10% only

While some differences in XRD patterns may possibly be related to crystalline morphology, equilibrium ion-exchange properties are not so dependent. Al-Chab has been found to be extremely selective towards heavy metals, especially divalent cations such as $Ba^{2+}$, $Sr^{2+}$, $Pb^{2+}$, $Cd^{2+}$ and $Hg^{2+}$, even at trace (ppm) levels. This behavior contrasts to that of the mineral willhendersonite which, despite prolonged exposure to ground water, was found to be free of strontium and barium, but rich in calcium. These chemical analysis results, coupled with the fact that high-calcium members of the chabazite group are inherently difficult to ion-exchange, make it reasonable to presume that willhendersonite, despite its high aluminum content, is an inferior ion-exchange agent.

Figure 4:
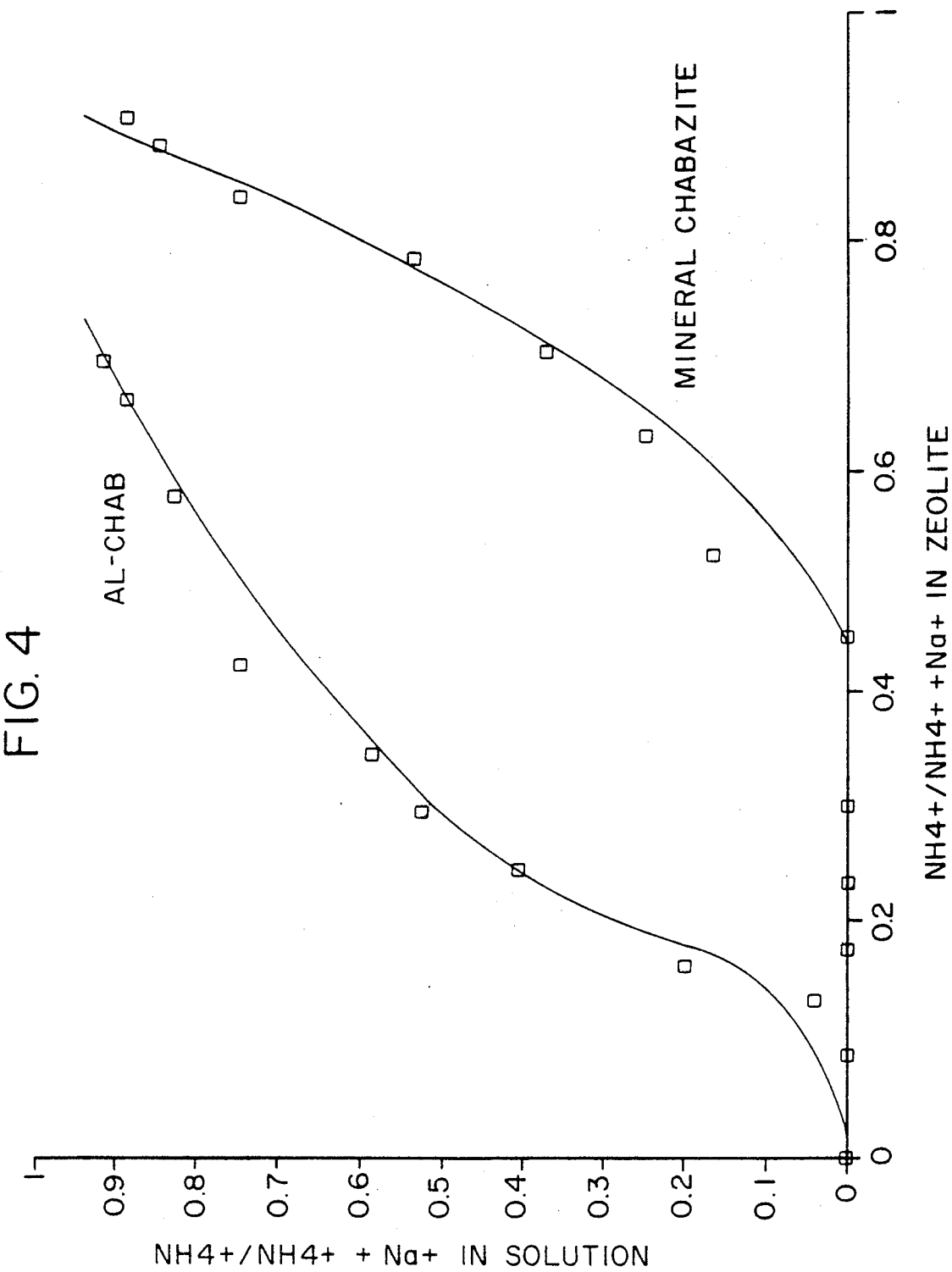

Ion exchange tests were also used to further differentiate between Al-Chab and K-G1. Barrer has stated that for aluminum-rich high charge density) K-GI, ion-exchange of heavy metals (high atomic weight) becomes less favored as charge density (aluminum content) increases. Comparative ion-exchange isotherms for ammonium ions ($NH_4^+$) on mineral chabazite and Al-Chab are shown in FIG. 4. These show that, contrary to the expected behavior of K-GI, ammonium capacity decreased with aluminum addition. The anomalous behavior was confirmed by ion-exchange tests involving silver ($Ag^+$) and lead ($Pb^{2+}$). The capacity of the ion-exchanger for these two heavy metals was greatly increased by aluminum addition. See, for example, the comparative silver isotherm in FIG. 5.

Thus the ion-exchange behavior, taken together with comparative XRD data, set Al-Chab clearly apart from other aluminum-rich members of the chabazite family of zeolites as a novel, potentially valuable ion-exchange agent.

In a typical embodiment of the invention, heavy metals or precious metals are extracted from solution by contact with particles of the ion-exchange agent of the present invention, Al-Chab. This may be accomplished, for example, by stirring the ion exchange agent of the present invention in the metal-bearing solution or by passing the solution through a column of aggregated Al-Chab, or by other suitable means. The precious metal-loaded Al-Chab is then mixed with flux and reductant, if necessary, and loaded into a suitable smelting vessel. The vessel is heated to greater than the melting point of the precious metal (typically 900° to 1200° C.) and maintained at that temperature for sufficient time, typically about one hour. After the smelting period, the precious metals will be found to segregated from the slag.

Precious metal recovery by smelting may involve complex charge formulations. There are several classes of reagent that may be required in a smelting charge. If the material contains base metals such as iron or copper, an oxidant such as litharge ($PbO_2$) or sodium nitrate ($NaNO_3$) will be required. Base metal oxides would be easily separable from the precious metals, which would not be oxidized. If a high volume of base metal oxides is expected during smelting, or if an inorganic sorbent is used, such as Al-Chab, a flux or fluxes may be required so that the impurity oxides can be removed as a liquid. Sodium meta-borate ($Na_2B_4O_7$) is a good flux for materials containing aluminum or zinc oxides, such as precious metal-laden Al-Chab. Sodium carbonate ($Na_2CO_3$) is used as a flux for silica. Lime (calcium oxide, CaO) is used as a sulfur removal agent. Excess silica ($SiO_2$) is sometimes added, as sand, as a bulking agent for the slag.

Processing of precious metal-bearing solids such as jewelry, electronic scrap, salts and sludges can be accomplished by hydrometallurgical means in conjunction with the present invention. Solid wastes containing silver, for example, may be treated with nitric or sulfuric acid to extract silver into a solution, from which the precious metal can easily and economically recovered by the present invention.

Silver can be recovered from aqueous solutions where the metal is present as the cation, i. e. sulfate, nitrate, ammonium or thiourea solutions, easily and economically by the present invention. Gold can likewise be recovered from chloride solutions employing the present invention.

The following examples are provided to illustrate the invention and are not to be taken as limiting the scope of the invention which is defined by the appended claims.

EXAMPLE 1

In an example of the present invention, silver was recovered from a pure silver nitrate solution. The solution was prepared by dissolving 15.75 g of reagent grade silver nitrate ($AgNO_3$) in one liter of deionized water to give a total silver content of 10.00 g and a silver concentration of 10.00 g/l. Twenty-five grams (air-equilibrated) of the ion-exchange agent of this invention, in powdered form, was mixed in the solution for fifteen minutes at room temperature.

Following filtration with deionized water washing, solids were dried at 125° C. for approximately 2 hours. The silver-loaded Al-Chab was then mixed with 25.0 g of sodium borate as flux. The smelting mixture was placed in a suitable-sized open ceramic crucible. Five grams of zinc was placed at the bottom of the crucible to act as a reducing agent.

The open crucible was heated to 2050° F. (1120° C.) at 36° F. (20° C.) per minute and maintained at that temperature for approximately one hour. The melt was cooled and solidified in the crucible. The silver was readily recovered by fracturing the crucible and breaking away the slag. Essentially all of the silver was recovered as a single large bead weighing 9.0 g, and several smaller beads, for a total weight approaching 10.0 g. Further trials, under nearly identical conditions, indicated that the zinc reductant may be unnecessary for silver recovery.

EXAMPLE 2

An additional example of the present invention was performed to evaluate the potential for selective extraction of silver from solutions containing competing base metal ions, using Al-Chab. Specifically, recovery of silver was attempted from nitrate solutions. All solutions used were prepared from reagent grade nitrate salts and deionized water.

Mixed silver/copper nitrate solutions were prepared with 10.0 gpl silver (0.09 M Ag$^+$) and 2, 15 or 30 gpl copper (0.03, 0.24 or 0.47 M Cu$^{2+}$). These solution composition correspond approximately to Ag$^{30}$/Cu$^{2+}$ molar ratios of 3:1, 1:3 and 1:5, respectively. A 250 ml portion of each solutions was treated with 25 g of the Al-Chab. Extractions of silver and copper, as measure by standard wet chemical analysis of the solutions, after 15 minutes of agitation at room temperature are given in Table 4.

TABLE 4

| Ratio Ag$^+$ to Cu$^{2+}$ | % extracted from solution | | Selectivity* |
|---|---|---|---|
| | Ag$^-$ | Cu$^{2+}$ | |
| 3:1 | 44 | 5.0 | 5.0 |
| 1:3 | 37 | 7.5 | 21.7 |
| 1:5 | 28 | 8.0 | 22.4 |

*selectivity = $\frac{\text{moles Ag extracted} \times \text{final [Cu}^{2+}]}{\text{moles Cu extracted} \times \text{final [Ag}^-]}$ It is expected that under conditions of more through contact, silver recovery would increase significantly. Note that selectivity for silver over copper increases despite increasing copper contamination. The silver that was extracted from solution onto the Al-Chab was easily and nearly quantitatively recovered by the smelting procedure described in Example 1, while essentially all detectable copper remained in the discarded slag as an oxide.

EXAMPLE 3

In an additional test of the present invention, gold was recovered from chloride solutions prepared by dissolving 14 karat gold jewelry in aqua regia and diluting the solution to an appropriate concentration. Upon contact with the Al-Chab, gold was extracted nearly quantitatively from the solution while base-metal alloying additives, such as nickel and zinc, were not extracted.

Gold jewelry (5.66 g, 14k) was dissolved in approximately 50 g of aqua regia and the resultant solution diluted to 3,000 ml with deionized water. This solution was stirred with 25 g of Al-Chab for 15 minutes at room temperature before filtration and drying of the solids as described in Example 1. The dried Al-Chab was smelted with 25 g of sodium metaborate, under the conditions given in Example 1, yielding gold bead weighing 2.90 g. This bead accounted for nearly 90% of the anticipated amount of recoverable gold, based on the fineness of the jewelry.

EXAMPLE 4

Eleven test solutions comprised of 250 ml of D. I. H$_2$O and varying amounts of lead nitrate [Pb(NO$_3$)$_2$], were prepared, mixed with 5 g Al-Chab each, and allowed to stand quiescently at room temperature for 72 hours. The amounts of lead added to the solutions were systematically varied from 0.1 to 10 times the theoretical maximum ion-exchange capacity of the Al-Chab (7 meq/g). Atomic adsorption (AA) analysis of the final solutions revealed lead concentration to be uniformly less than 1 ppm, until a loading of 4 meq/g was exceeded. An identical test employing mineral chabazite which, while quite selective for lead, lacks the capacity and near absolute selectivity of Al-Chab, revealed measurable lead remaining in solution at a loading of less than 1 meq/g. The comparative lead extraction data is represented graphically in FIG. 6.

EXAMPLE 5

The Linde commercial adsorbent, AW500, is a relatively phase-pure, mixed cation mineral chabazite. It was thus predicted that this material should be at least moderately suitable for conversion into Al-Chab. To test this presumption, AW500 was substituted directly for the high sodium chabazite in a standard Al-Chab preparation.

The formulation for this test consisted of 250 g (air-equilibrated) AW500 powder, 120 g of Hydral$^R$ hydrated alumina (64.1% Al$_2$O$_3$), 110 g NaOH and 1,000 g deionized H$_2$O. Agitating this mixture in a water bath at 72.5 + 2° C. for three days did, in fact, yield Al-Chab. This was evident from a comparison of X-ray diffraction patterns of the product and the original AW500. In particular, the lead peak was shifted to 9.5 A°, compared to 9.15 A° for the starting AW500.

We claim:

1. Aluminum enriched chabazite characterized by an X-ray diffraction having a lead peak at about 9.5 Angstrom units and significant peaks at about 3.02 and about 6.36 Angstrom units.

2. A method for increasing the ion-exchange capacity of a source of chabazite which consists essentially of mixing said source of chabazite with a source of aluminum at an alkaline pH and recovering an aluminum-enriched chabazite product characterized by having a Si:Al molar ration of about 1, exhibiting an X-ray diffraction pattern such that the lead peak is about 9.5 Angstrom units and having an ion-exchange capacity significantly higher than that of said source of chabazite before said treatment.

3. The method of claim 2 wherein said source of aluminum is sodium aluminate.

4. The method of claim 2 wherein said source of aluminum is hydrated alumina.

5. The process of claim 2 wherein said source of chabazite has approximately the composition shown in TABLE 2 before treatment and the product has approximately the composition also shown in TABLE 2 after treatment.

* * * * *